Patented Feb. 22, 1944

2,342,546

UNITED STATES PATENT OFFICE 2,342,546

PRODUCTION AND USE OF DYESTUFFS

John David Kendall, Ilford, England, assignor to Ilford Limited, Ilford, England, a British company No Drawing. Application May 9, 1940, Serial No. 334,289. In Great Britain November 14, 1936

4 Claims. (Cl. 95—7)

This invention relates to the production and use of dyestuffs for sensitising photographic silver halide emulsions and is a continuation in part of my application S. No. 174,489 filed November 13, 1937.

In application S. No. 174,489 there is described a process for the manufacture of dyestuffs which comprises condensing a five-membered ring compound containing the system:

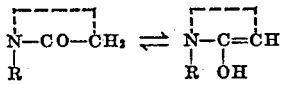

in which R represents hydrogen, an alkyl, aryl or aralkyl group, in the presence of an anhydride of a monobasic organic acid and an acid binding agent, with a quaternary salt of a heterocyclic nitrogen compound having a reactive methyl group in the α or γ position to the nitrogen atom.

In the production of copies of photographic images using copying light from an artificial source it is frequently desirable that the copy material should be colour sensitised. However, the field of suitable sensitising dyes is very limited since it is desirable that the dye should be a powerful sensitiser but should not extend the sensitivity of the emulsion to light of such wavelengths that the copy material fogs in the safelights commonly used, and also most important that the dye should not leave a coloured stain on the copy material after processing. None of the specific dyestuffs mentioned in the examples in application S. No. 174,489 wholly satisfies these requirements.

It has now been discovered that if in the process of application S. No. 174,489 there is employed (as the five-membered ring compound) rhodanic acid, 2-thio-4-keto-tetrahydro-oxazole, or an N-alkyl, N-aryl or N-aralkyl derivative thereof, and (as the quaternary salt of a heterocyclic nitrogen compound) a quaternary salt of thiazoline containing a reactive methyl group in the α position to the nitrogen atom, dyestuffs are produced which are powerful sensitisers for the blue to green region of the spectrum and are of especial value inasmuch as they are substantially destroyed and/or discharged during the normal processing of silver halide emulsion coatings containing them.

According to this invention, therefore, sensitising dyes of especial value are produced by condensing rhodanic acid, 2-thio-4-keto-tetrahydro-oxazole or an N-alkyl, N-aryl or N-aralkyl derivative of either, in the presence of an anhydride of a monobasic carboxylic acid and an acid binding agent, with a quaternary salt of thiazoline containing a reactive methyl group in the α-position to the nitrogen atom.

As examples of N-alkyl, N-aryl and N-aralkyl derivatives of rhodanic acid and 2-thio-4-keto-tetrahydro-oxazole there may be mentioned the N-methyl, N-ethyl, N-propyl and N-higher alkyl derivatives, N-phenyl and N-naphthyl derivatives, and N-benzyl and N-phenylethyl derivatives.

Silver halide emulsions containing the dyes which form an important aspect of the invention may be prepared in various manners. They may be incorporated in the emulsion before it is coated on a support or alternatively the support (e. g. a plate or paper or film) coated with the emulsion may be bathed in a solution containing one or more of the compounds.

The actual quantity of the compound incorporated in the emulsion will vary to a certain extent with the individual compounds, and with the ultimate effect which it is desired to obtain. As an indication of the order of the quantities employed 60–100 cc. of a one in one thousand solution of the dye may be incorporated in six and a half litres of emulsion equivalent to about two hundred and fifty grammes of silver nitrate, or the coated support may be bathed in a one in one thousand solution of the compound or an even more dilute solution. The strength of the solution may vary according to the dye used and may be as low as one in ten thousand.

Various types of silver halide emulsions are benefited by the treatment, including simple and mixed emulsions, e. g. silver chloride, silver bromide, silver chlorobromide, silver iodobromide, and silver chlorobromo iodo emulsions. The compounds are readily removed by the processing baths used in normal processing of films to image records. This is of considerable importance in multilayer elements wherein the sensitisers are not close to the surface of an emulsion.

The products prepared by the process described have the general formula:

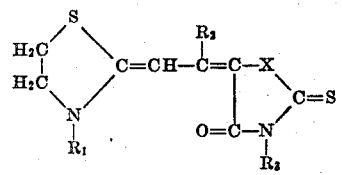

where $R_1$ and $R_2$ are hydrocarbon groups, $R_3$ is hydrogen or an hydrocarbon group and X is oxygen or sulphur.

Thus, for example, $R_1$, $R_2$ and $R_3$ may be alkyl groups, e. g. methyl, ethyl, propyl, isopropyl and higher alkyl groups, aralkyl groups, e. g. benzyl groups, and phenyl ethyl groups and aryl groups, e. g. phenyl and naphthyl groups, and substituted aryl groups e. g. chlorphenyl groups. Preferably, however, the group $R_1$ is an alkyl group.

The properties of the products, as indicated above, render them of especial value as additions to silver halide emulsions coated on paper supports.

The following examples illustrate the invention:

Example I

The dyestuff of the formula:

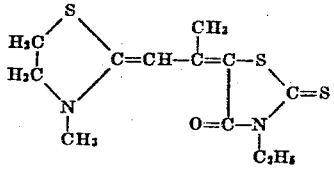

was prepared by the following method. 1.03 gms. of 2-methylthiazoline were fused with 1.86 gms. of methyl-p-toluene sulphonate at 130–140° C. for three hours. The quaternary salt thus formed was boiled gently for two hours under a reflux condenser with 1.61 gms. of N-ethyl rhodanic acid, 12 ccs. of pyridine and 3 ccs. of acetic anhydride. The solution was then diluted with a small quantity of ethyl alcohol and allowed to cool. The crude dyestuff separated out and was purified by extraction with 50 ccs. of hot methyl alcohol. The dyestuff was thus obtained as red crystals having a melting point of 238° C.

The dyestuff is an excellent sensitiser for gelatino-silver chloride emulsions imparting a band of sensitivity of approximately 4500–5750 Å. with a maximum at about 5350 Å. It is also a powerful sensitiser for gelatino-silver iodobromide emulsions extending the sensitivity to 5700 Å. with a maximum at 5400 Å. It is destroyed and/or discharged during the normal processing applied to a gelatino-silver halide emulsion coating containing it and leaves no perceptible stain.

Example II

The dyestuff of the formula:

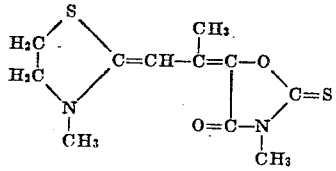

was prepared by the following method. 1.03 gms. of 2-methylthiazoline were fused with 1.86 gms. of methyl-p-toluene sulphonate at 130–140° C. for three hours. The quaternary salt thus formed was boiled gently for two hours under a reflux condenser with 1.31 gms. of N-methyl-2-thio-4-ketotetrahydro-oxazole, 12 ccs. of pyridine and 3 ccs. of acetic anhydride. The hot solution was then diluted with aqueous ethyl alcohol and allowed to cool. The crude dyestuff separated out and was purified by extraction with 30 ccs. of hot methyl alcohol. The product was obtained as orange crystals having a melting point of 214° C.

Included in a gelatino-silver chloride emulsion it imparts an extra band of sensitivity between 4100–5250 Å. with a maximum at 5000 Å. It is destroyed and/or discharged during normal processing treatments applied to a gelatino-silver halide emulsion coating containing it and leaves no perceptible stain.

Example III

The dyestuff of the formula:

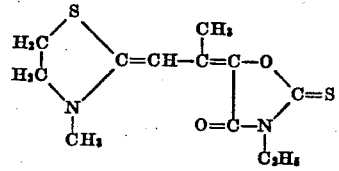

was prepared by the following method. 2.06 gms. of 2-methylthiazoline were fused with 3.72 gms. of methyl-p-toluene sulphonate at 130–140° C. for three hours. The quaternary salt thus formed was boiled gently for two hours under a reflux condenser with 2.90 gms. of N-ethyl-2-thio-4-ketotetrahydro-oxazole, 15 ccs. of pyridine and 6 ccs. of acetic anhydride. The hot solution was diluted with aqueous ethyl alcohol and allowed to cool. The crude dyestuff separated out and was purified by recrystallisation from 30 ccs. of hot methyl alcohol. The product was obtained as orange red crystals having a melting point of 182° C. Included in a silver chloride emulsion it imparts an extra band of sensitivity between 4150 Å. and 5300 Å. with a maximum at about 5000 Å. It is also a sensitiser for silver iodobromide emulsions extending the sensitivity thereof to about 5300 Å. with a maximum at 5000 Å. It is destroyed and/or discharged during normal processing treatments applied to a gelatino-silver halide emulsion coating containing it, leaving no perceptible stain.

Example IV

The dyestuff of the formula:

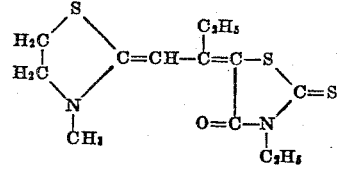

was prepared by the following method. 2.06 gms. of 2-methyl-thiazoline were fused with 3.72 gms. of methyl-p-toluene sulphonate at 130–140° C. for three hours. The quaternary salt thus formed was boiled gently for two hours under a reflux condenser with 3.22 gms. of N-ethyl rhodanic acid, 10 ccs. of pyridine and 7 ccs. of propionic anhydride. The hot solution was diluted with ethyl alcohol and allowed to cool. The crude dyestuff which separated was extracted with 40 ccs. of hot methyl alcohol and the product was obtained as red crystals having a melting point of 215° C. The product included in a gelatino-silver chloride emulsion imparts a band of sensitivity between 4600 Å. and 5650 Å. with a maximum at 5350 Å. It is destroyed and/or discharged during normal processing treatments applied to a gelatino-silver halide emulsion coating containing it, leaving no perceptible stain.

Example V

The dyestuff of the formula:

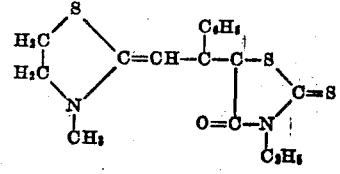

was prepared by the following method: 2.02 grams. of 2-methyl-thiazoline were fused with 3.72 grams. of methyl-p-toluene sulphonate for three hours at 130° C. The quaternary salt thus formed was then refluxed with 3.22 grams. of N-ethyl rhodanic acid, 16 ccs. of pyridine and 12 grams. of benzoic anhydride for two hours. The solution was then cooled and diluted with water. An oil separated out and was removed by decantation and treated with acetone. The product was thus obtained as a solid which, after boiling out with ethyl alcohol, had a melting point of 234° C. with decomposition.

*Example VI*

This example illustrates the formation of a light-sensitive gelatino-silver halide material in accordance with the invention. To a normally prepared "gaslight" emulsion was added 8 ccs. of a 0.05% solution of each of the dyestuffs referred to in the foregoing examples, per pound of emulsion, a mixture of ethyl alcohol, acetone and water in the ratio 2:1:1 being used as the solvent. The resulting emulsions were then coated on paper supports by the usual coating methods. The resulting sensitised papers were very suitable for printing purposes and shewed, after processing, no residual stain due to the presence of the sensitising dye.

Although in the foregoing example the quaternary salt employed in each case is methyl-p-toluene sulphonate, it will be appreciated that other quaternary salts may be employed, e. g. other alkyl, aryl or aralkyl-p-toluene sulphonates and alkyl, aryl and aralkyl halides, sulphates, nitrates and perchlorates.

As specific examples there may be mentioned ethyl-para-toluene sulphonate, dimethyl sulphate, methyl, ethyl, propyl, allyl and benzyl chlorides and bromide, ethyl nitrate and ethyl perchlorate.

Again, whilst the foregoing examples each use pyridine as the acid binding agent, other acid binding agents may be employed, e. g. other tertiary nitrogen bases, as for instance, trialkylamines (e. g. triethylamine, tripropylamine and methyl diethylamine) dimethyl aniline and alkali metal salts of organic acids, e. g. sodium acetate.

Instead of the acetic anhydride, propionic anhydride and benzoic anhydride used in the foregoing examples, other monocarboxylic acid anhydrides may be used, e. g. butyric anhydride, isobutyric anhydride, valeric anhydride, toluic anhydride, phenyl ethyl carboxylic acid anhydride, and substituted monocarboxylic acid anhydrides, e. g. chlorbenzoic acid anhydride.

As indicated above, the products of this invention are especially suitable for the sensitisation of emulsions intended to be coated on paper supports to produce light-sensitive copy material. The dyes increase the sensitivity of the emulsions to artificial light to a very useful degree. Moreover, compared with other types of sensitising dyes, e. g. the comparable types disclosed in the parent application No. 174,489, they present the advantage that they are very readily bleached and/or destroyed by the usual acid hypo baths so that the resulting image is quite clean.

I claim:

1. A photographic silver halide emulsion containing in sensitising amounts a dyestuff of the general formula:

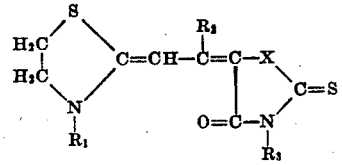

wherein $R_1$ and $R_2$ are hydrocarbon groups, $R_3$ is a member of the group consisting of hydrogen and hydrocarbon groups, and X is a divalent atom selected from the group consisting of oxygen and sulfur.

2. A photographic element bearing at least one silver halide emulsion layer comprising a colloid binding agent containing in sensitising amounts a dyestuff of the general formula:

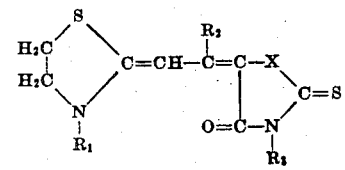

wherein $R_1$ and $R_2$ are hydrocarbon groups, $R_3$ is a member of the group consisting of hydrogen and hydrocarbon groups and X is a divalent atom selected from the group consisting of oxygen and sulfur.

3. A photographic element bearing at least one silver halide emulsion layer comprising a colloid binding agent containing in sensitising amounts a dyestuff of the general formula:

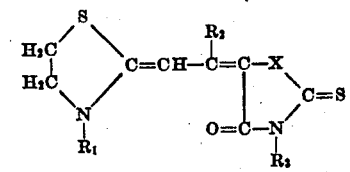

wherein $R_1$, $R_2$ and $R_3$ each stand for an alkyl radical of 1 to 2 carbon atoms, and X is a divalent atom selected from the group consisting of oxygen and sulfur.

4. A photographic printing paper bearing at least one silver halide emulsion layer comprising a colloid binding agent containing in sensitising amounts a dyestuff of the general formula:

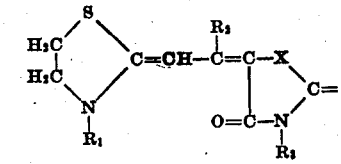

wherein $R_1$ and $R_2$ are hydrocarbon groups, $R_3$ is a member of the group consisting of hydrogen and hydrocarbon groups and X is a divalent atom selected from the group consisting of oxygen and sulphur.

JOHN DAVID KENDALL.